US008929369B1

United States Patent
Shain et al.

(10) Patent No.: US 8,929,369 B1
(45) Date of Patent: Jan. 6, 2015

(54) SYSTEM AND METHOD FOR STRIPING / MIRRORING DATA

(75) Inventors: Randall H. Shain, Wrentham, MA (US); Kiran Madnani, Framingham, MA (US); Roy E. Clark, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 12/415,234

(22) Filed: Mar. 31, 2009

Related U.S. Application Data (63) Continuation-in-part of application No. 11/967,856, filed on Dec. 31, 2007, now Pat. No. 7,843,866, and a continuation-in-part of application No. 11/967,882, filed on Dec. 31, 2007, now abandoned.

(51) Int. Cl.
| | | |
|---|---|---|
| H04L 12/28 | (2006.01) | |
| H04L 12/56 | (2006.01) | |
| G06F 13/00 | (2006.01) | |
| G06F 13/28 | (2006.01) | |
| G06F 15/16 | (2006.01) | |

(52) U.S. Cl.
USPC ............................ 370/390; 711/117; 709/217

(58) Field of Classification Search
CPC .. H04L 67/1097; H04L 12/18; H04L 67/1095
USPC ................... 370/312, 390, 432; 711/114, 147; 709/217
See application file for complete search history.

(56) References Cited

U.S. PATENT DOCUMENTS

| | | | | |
|---|---|---|---|---|
| 6,092,215 A * | 7/2000 | Hodges et al. | ...... | 714/6 |
| 6,665,780 B1 * | 12/2003 | Bradley | ........ | 711/162 |
| 6,834,326 B1 * | 12/2004 | Wang et al. | .......... | 711/114 |
| 7,385,978 B1 * | 6/2008 | Yang et al. | .......... | 370/390 |
| 7,529,781 B2 | 5/2009 | Frey et al. | | |
| 7,590,114 B1 | 9/2009 | Bishara | | |
| 7,673,112 B2 | 3/2010 | Takeuchi et al. | | |
| 7,843,866 B1 | 11/2010 | Madnani et al. | | |
| 8,386,727 B2 * | 2/2013 | Olarig et al. | .......... | 711/157 |
| 2003/0135784 A1 | 7/2003 | Yamaguchi et al. | | |
| 2003/0140210 A1 * | 7/2003 | Testardi | ........ | 711/203 |
| 2003/0188035 A1 * | 10/2003 | Lubbers et al. | .......... | 709/310 |
| 2003/0188233 A1 * | 10/2003 | Lubbers et al. | .......... | 714/100 |
| 2005/0076091 A1 * | 4/2005 | Missimer et al. | .......... | 709/217 |
| 2005/0193037 A1 * | 9/2005 | Adiba et al. | .......... | 707/203 |

(Continued)

OTHER PUBLICATIONS

Handley, et al., The Reliable Multicast Design Space for Bulk Data Transfer (RFC:2887), Aug. 2000, Network Working Group, 22 pages.

(Continued)

*Primary Examiner* — Hoang-Chuong Vu
(74) *Attorney, Agent, or Firm* — Holland & Knight LLP; Brian J. Colandreo, Esq.; Mark H. Whittenberger, Esq.

(57) ABSTRACT

A method and computer program product for defining a multicast group within a local area network. The multicast group includes a storage initiator device and a plurality of mirrored targets. Each mirrored target includes a plurality of storage targets. A write request for storing a data segment within the multicast group is received on the storage initiator device. The data segment is multicast to the plurality of mirrored targets included within the multicast group. A unique data chunk of the data segment is stored on each of the plurality of mirrored targets.

20 Claims, 3 Drawing Sheets

(56) References Cited

U.S. PATENT DOCUMENTS

| | | | |
|---|---|---|---|
| 2005/0229021 A1* | 10/2005 | Lubbers et al. | 714/2 |
| 2005/0254444 A1 | 11/2005 | Meier et al. | |
| 2005/0256972 A1* | 11/2005 | Cochran et al. | 709/245 |
| 2005/0257082 A1* | 11/2005 | Zohar et al. | 714/6 |
| 2006/0015946 A1* | 1/2006 | Yagawa | 726/32 |
| 2006/0291467 A1 | 12/2006 | Henry et al. | |
| 2007/0220311 A1* | 9/2007 | Lewin et al. | 714/6 |
| 2008/0244174 A1* | 10/2008 | Abouelwafa et al. | 711/114 |
| 2009/0006746 A1* | 1/2009 | Sharma et al. | 711/114 |
| 2009/0061773 A1* | 3/2009 | Loh et al. | 455/41.2 |
| 2009/0094252 A1 | 4/2009 | Wong et al. | |
| 2009/0177840 A1 | 7/2009 | Dale et al. | |
| 2009/0287892 A1* | 11/2009 | Sharma et al. | 711/156 |
| 2012/0084384 A1* | 4/2012 | Erickson | 709/213 |
| 2012/0311256 A1* | 12/2012 | Nakajima et al. | 711/114 |
| 2013/0346739 A1* | 12/2013 | VanHeyningen et al. | 713/153 |

OTHER PUBLICATIONS

What is MAC Address? Retrieved from http://www.iplocation.net/tools/mac-address.php on Jan. 21, 2014. 1 page.

\* cited by examiner

SYSTEM AND METHOD FOR STRIPING / MIRRORING DATA

RELATED APPLICATION(S)

This application is a continuation-in-part of: U.S. patent application Ser. No. 11/967,856, entitled SYSTEM AND METHOD FOR MIRRORING DATA, which was filed on 31 Dec. 2007; and U.S. patent application Ser. No. 11/967,882, entitled SYSTEM AND METHOD FOR STRIPING DATA, which was filed on 31 Dec. 2007

TECHNICAL FIELD

This disclosure relates to storage networks and, more particularly, to multicast storage networks.

BACKGROUND

Storing and safeguarding electronic data is of paramount importance in modern business. Accordingly, various systems may be employed to protect such electronic data.

For example, disk arrays may be employed that contain multiple storage devices. Disk arrays may provide some level of redundancy by use of mirrored or redundant components (e.g., disk drives, disk controllers, power supplies and/or fans), each of which may be hot-swappable to avoid downtime.

Disk arrays may fall into a plurality of categories, such as Network Attached Storage (NAS) and Storage Area Networks (SAN). An NAS may be a stand-alone, network-accessible, hard disk storage system that may provide file-level access to electronic data. A SAN array may be a dedicated storage system that may connect numerous storage resources to one or many servers. A SAN may provide block-level access to electronic data through one or more SCSI-based protocols (e.g., Fiber Channel and iSCSI).

SUMMARY OF DISCLOSURE

In a first implementation, a multicast data striping method includes defining a multicast group within a local area network. The multicast group includes a storage initiator device and a plurality of mirrored targets. Each mirrored target includes a plurality of storage targets. A write request for storing a data segment within the multicast group is received on the storage initiator device. The data segment is multicast to the plurality of mirrored targets included within the multicast group. A unique data chunk of the data segment is stored on each of the plurality of mirrored targets.

One or more of the following features may be included. Defining the multicast group may include defining a group of IP addresses to be addressable as a whole by a single multicast IP address. Defining the multicast group may include defining a group of MAC addresses to be addressable as a whole by a single multicast MAC address.

At least one of the plurality of storage targets may be chosen from the group consisting of: a hard drive; a RAID array of hard drives; a computer device including one or more hard drives; and a storage area network.

In another implementation, a multicast data striping method includes defining a multicast group within a local area network. The multicast group includes a storage initiator device and a plurality of mirrored targets. Each mirrored target includes a plurality of storage targets. A read request for reading a data segment from the multicast group is received on the storage initiator device. The read request is multicast to the plurality of mirrored targets included within the multicast group. A unique data chunk of the data segment is received on the storage initiator device from each of the plurality of mirrored targets.

One or more of the following features may be included. Defining the multicast group may include defining a group of IP addresses to be addressable as a whole by a single multicast IP address. Defining the multicast group may include defining a group of MAC addresses to be addressable as a whole by a single multicast MAC address.

At least one of the plurality of storage targets may be chosen from the group consisting of: a hard drive; a RAID array of hard drives; a computer device including one or more hard drives; and a storage area network.

The unique data chunk received from each of the plurality of mirrored targets may be combined on the storage initiator device to generate the data segment. Each unique data chunk of the data segment received on the storage initiator device may be multicast from one or more of the mirrored targets.

In another implementation, a computer program product resides on a computer readable medium that has a plurality of instructions stored on it. When executed by a processor, the instructions cause the processor to perform operations including defining a multicast group within a local area network. The multicast group includes a storage initiator device and a plurality of mirrored targets. Each mirrored target includes a plurality of storage targets. A read request for reading a data segment from the multicast group is received on the storage initiator device. The read request is multicast to the plurality of mirrored targets included within the multicast group. A unique data chunk of the data segment is received on the storage initiator device from each of the plurality of mirrored targets.

One or more of the following features may be included. Defining the multicast group may include defining a group of IP addresses to be addressable as a whole by a single multicast IP address. Defining the multicast group may include defining a group of MAC addresses to be addressable as a whole by a single multicast MAC address.

At least one of the plurality of storage targets may be chosen from the group consisting of: a hard drive; a RAID array of hard drives; a computer device including one or more hard drives; and a storage area network.

The unique data chunk received from each of the plurality of mirrored targets may be combined on the storage initiator device to generate the data segment. Each unique data chunk of the data segment received on the storage initiator device may be multicast from one or more of the mirrored targets.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
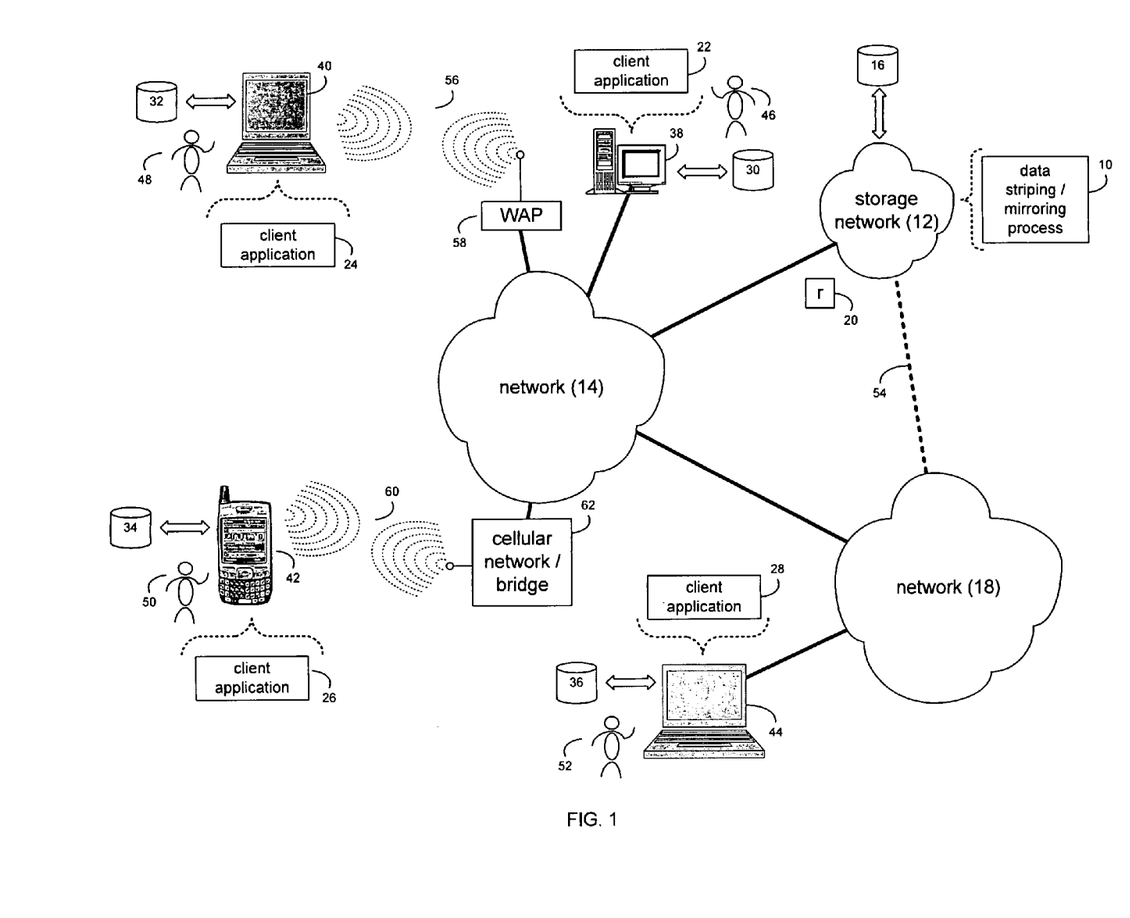
FIG. 1 is a diagrammatic view of a storage array and a data striping/mirroring process coupled to a distributed computing network.

Referring to FIG. 1, there is shown data striping/mirroring process 10 that may reside on and may be executed by storage network 12, which may be connected to network 14 (e.g., the Internet or a local area network). Examples of storage network 12 may include, but are not limited to: a Network Attached Storage (NAS) system and a Storage Area Network (SAN). As will be discussed below in greater detail, a SAN may include one or more of a personal computer, a server computer, a series of server computers, a mini computer, a mainframe computer, a RAID array and an NAS. The various components of storage network 12 may execute one or more operating systems, examples of which may include but are not limited to: Microsoft Windows XP Server™; Novell Netware™; Redhat Linux™, Unix, or a custom operating system, for example.

As will be discussed below in greater detail, data striping/mirroring process 10 may define a multicast group within a local area network. The multicast group may include a storage initiator device and a plurality of mirrored targets. Each mirrored target may include a plurality of storage targets.

A write request for storing a data segment within the multicast group may be received on the storage initiator device. The data segment may be multicast to the plurality of mirrored targets included within the multicast group. A unique data chunk of the data segment may be stored on each of the plurality of mirrored targets.

A read request for reading a data segment from the multicast group may be received on the storage initiator device. The read request may be multicast to the plurality of mirrored targets included within the multicast group. A unique data chunk of the data segment may be received on the storage initiator device from each of the plurality of mirrored targets.

The instruction sets and subroutines of data striping/mirroring process 10, which may be stored on storage device 16 included within storage network 12, may be executed by one or more processors (not shown) and one or more memory architectures (not shown) included within storage network 12. Storage device 16 may include but is not limited to: a hard disk drive; a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Various data requests (e.g. data request 20) may be sent from client applications 22, 24, 26, 28 to storage network 12. Examples of data request 20 may include but are not limited to data write requests (i.e. a request that a data segment be written to storage network 12) and data read requests (i.e. a request that a data segment be read from storage network 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage network 12 directly through network 14 or through secondary network 18. Further, storage network 12 may be connected to network 14 through secondary network 18, as illustrated with link line 54 (shown in phantom).

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

The Data Striping/Mirroring Process:

For the following discussion, client application 22 is going to be described for illustrative purposes. However, this is not intended to be a limitation of this disclosure, as other client applications (e.g., client applications 24, 26, 28) may be equally utilized.

Figure 2:
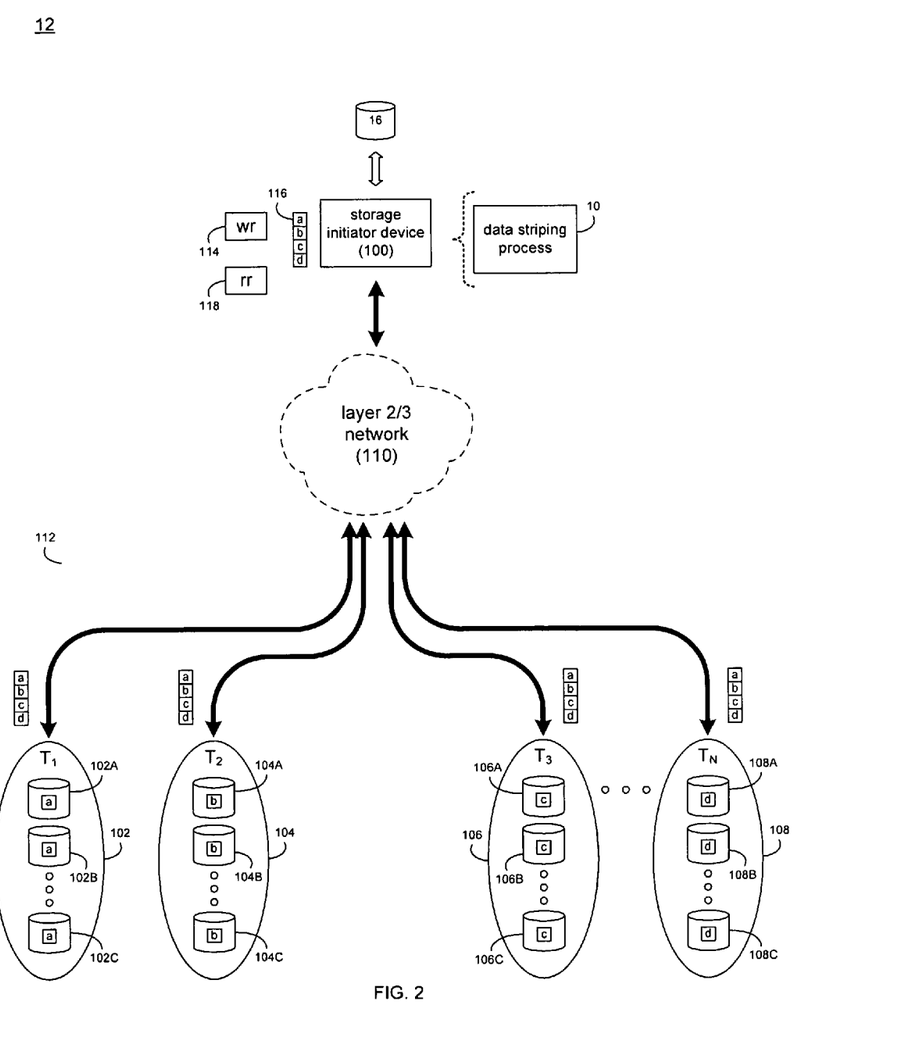
FIG. 2 is a diagrammatic view of the storage array of FIG. 1.

Referring also to FIG. 2, storage network 12 may include a storage initiator device (e.g. storage initiator device 100) and a plurality of mirrored targets $T_{1-n}$ (e.g. mirrored targets 102, 104, 106, 108). While in this particular example, storage network 12 is shown to include four mirrored targets (e.g. mirrored targets 102, 104, 106, 108), this is for illustrative purposes only and is not intended to be a limitation of this disclosure. Specifically, the actual number of mirrored targets may be increased or decreased depending upon e.g. various design criteria.

Each mirrored target (e.g. mirrored target 102, 104, 106, 108) may include a plurality of storage targets (e.g., storage targets 102A, 102B, 102C) that may be mirrored with respect to each other. For example, if a data file (or portion thereof) is provided to mirrored target 102 for storage, an identical copy of the data file may be stored on each of storage targets 102A, 102B, 102C.

The manner in which storage network 12 is implemented may vary depending upon e.g. the level of redundancy required. For example, storage network 12 may be configured as a SAN, in which storage initiator device 100 may be e.g., a server computer and each of mirrored targets 102, 104, 106, 108 may be a RAID array. Further still, one or more of mirrored targets 102, 104, 106, 108 may be a SAN.

In the event that storage network 12 is configured as a SAN, the various components of storage network 12 (e.g. storage initiator device 100 and mirrored targets 102, 104, 106, 108) may be coupled using network infrastructure 110, examples of which may include but are not limited to a Layer 2 network and a Layer 3 network.

As is known in the art, the data link layer is Layer 2 of the seven-layer OSI model as well as the five-layer TCP/IP model. Layer 2 may respond to service requests from the network layer and may issue service requests to the physical layer. Within a Layer 2 network, devices (e.g. storage initiator device 100 and mirrored targets 102, 104, 106, 108) may be addressed using MAC (i.e., Media Access Control) addresses. When network infrastructure 110 is a Layer 2 network infrastructure, each of storage initiator device 100 and mirrored targets 102, 104, 106, 108 may have a unique MAC address.

Further and as is known in the art, the network layer is Layer 3 of the seven-layer OSI model as well as the five-layer TCP/IP model. Layer 3 may respond to service requests from the transport layer and may issue service requests to the data link layer. In the TCP/IP model, Layer 3 may be referred to as the Internet layer. Within a Layer 3 network, devices (e.g. storage initiator device 100 and mirrored targets 102, 104, 106, 108) may be addressed using IP (i.e., Internet Protocol) addresses. When network infrastructure 110 is a Layer 3 network infrastructure, each of storage initiator device 100 and mirrored targets 102, 104, 106, 108 may have a unique IP address.

Generally, the network layer (i.e., Layer 3) may be responsible for end-to-end (e.g., source to destination) data delivery, whereas the data link layer (i.e., Layer 2) may be responsible for node-to-node (e.g., hop to hop) data delivery.

Storage initiator device 100 may execute all or a portion of data striping/mirroring process 10. Additionally, one or more of mirrored targets 102, 104, 106, 108 may execute all or a portion of data striping/mirroring process 10. For example, data striping/mirroring process 10 may be a multi-component process that includes e.g., an initiator-based component (not shown) and a target-based component (not shown). For example and for illustrative purposes, the initiator-based component of data striping/mirroring process 10 may be executed on storage initiator device 100. Further and for illustrative purposes, the target-based component of data striping/mirroring process 10 may be executed on each of mirrored targets 102, 104, 106, 108. Accordingly, the initiator-based component of data striping/mirroring process 10 and the target-based component(s) of data striping/mirroring process 10 may cooperatively operate to effectuate all of the functionality of data striping/mirroring process 10.

The instruction sets and subroutines of the initiator-based component of data striping/mirroring process 10, which may be stored on a storage device (e.g., storage device 16) coupled to storage initiator device 100, may be executed by one or more processors (not shown) and one or more memory architectures (not shown) included within storage initiator device 100. Storage device 16 may include but is not limited to: a hard disk drive; a tape drive; an optical drive; a RAID array; a random access memory (RAM); and a read-only memory (ROM).

The instruction sets and subroutines of the target-based component of data striping/mirroring process 10, which may be stored on a storage device (not shown) coupled to e.g., each of mirrored targets 102, 104, 106, 108, may be executed by one or more processors (not shown) and one or more memory architectures (not shown) included within each of mirrored targets 102, 104, 106, 108. The storage device (not shown) may include but is not limited to: a hard disk drive; a tape drive; an optical drive; a RAID array; a random access memory (RAM); and a read-only memory (ROM).

Figure 3:
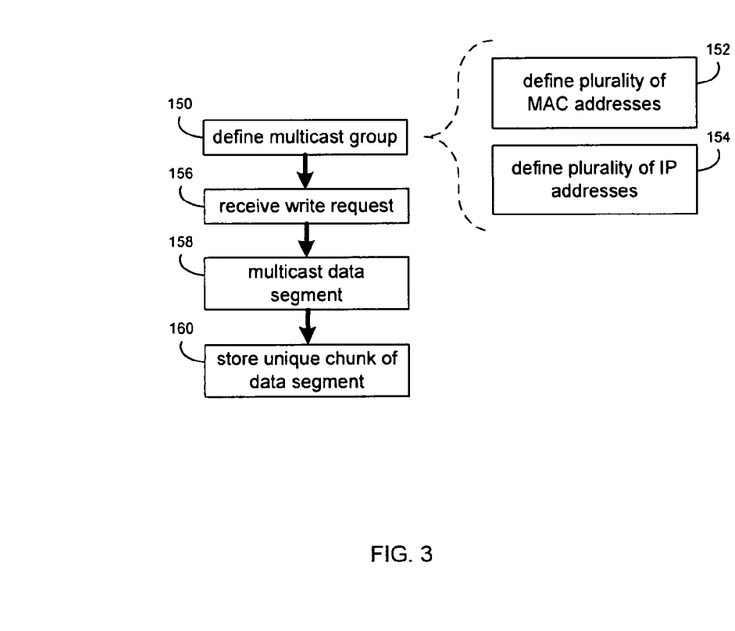
FIG. 3 is a flowchart of a data write process executed by the data striping/mirroring process of FIG. 1.

Referring also to FIG. 3, data striping/mirroring process 10 may utilize multicasting to distribute data requests between various devices (e.g. storage initiator device 100 and mirrored targets 102, 104, 106, 108) included within storage network 12. Accordingly, data striping/mirroring process 10 may define 150 a multicast group (e.g. multicast group 112) within network infrastructure 110, such that a message multicast by any device within storage network 12 may be received by any other device within storage network 12. Therefore, when a message is multicast within storage network 12, an identical copy of that message is received by all devices included within storage network 12, namely e.g., storage targets 102A, 102B, 102C (which make up mirrored target 102), storage targets 104A, 104B, 104C (which make up mirrored target 104), storage targets 106A, 106B, 106C (which make up mirrored target 106), and storage targets 108A, 108B, 108C (which make up mirror target 108).

When defining multicast group 112, the manner in which the multicast group is defined may vary depending on the type of network infrastructure (e.g. Layer 2 or Layer 3). For example, when data striping/mirroring process 10 is defining 150 a multicast group within a Layer 2 network infrastructure, data striping/mirroring process 10 may define 152 multicast group 112 as a plurality of MAC addresses to be addressable as a whole by a single multicast MAC address. Alternatively, when data striping/mirroring process 10 is defining 150 a multicast group within a Layer 3 infrastructure, data striping/mirroring process 10 may define 154 multicast group 112 as a plurality of IP addresses to be addressable as a whole by a single multicast IP address.

As discussed above, various data requests (e.g. data request 20) may be sent from client applications 22, 24, 26, 28 to storage network 12, and examples of data request 20 may include but are not limited to data write requests (i.e. a request that a data segment be written to storage network 12) and data read requests (i.e. a request that a data segment be read from storage network 12).

Upon storage initiator device 100 receiving 156 a write request (e.g. write request 114) for storing a data segment (e.g. data segment 116) within multicast group 112, data striping/mirroring process 10 may multicast 158 data segment 116 to the mirrored targets (e.g. mirrored targets 102, 104, 106, 108) included within multicast group 112. When multicasting 158 data segment 116 to each of mirrored targets 102, 104, 106, 108, data striping/mirroring process 10 may provide data segment 116 in its entirety to the mirrored targets. For illustrative purposes, assume that data segment 116 is an eight-kilobyte data segment that includes four two-kilobyte data chunks, namely data chunk "a", data chunk "b", data chunk "c", and data chunk "d". Accordingly, when multicasting 158 data segment 116 to each of mirrored targets 102, 104, 106, 108, data striping/mirroring process 10 may multicast 158 the entire eight-kilobyte data segment (including data chunk "a", data chunk "b", data chunk "c", and data chunk "d").

Upon receiving data segment 116, which was multicast 158 by storage initiator device 100, data striping/mirroring process 10 may store 160 a unique data chunk of the data segment 116 on each of the plurality of mirrored targets (e.g. mirrored targets 102, 104, 106, 108). For example, data striping/mirroring process 10: may store 160 data chunk "a" on mirrored target 102; may store 160 data chunk "b" on mirrored target 104; may store 160 data chunk "c" on mirrored target 106; and may store 160 data chunk "d" on mirrored target 108. Accordingly, a unique data chunk (e.g., data chunk "a", data chunk "b", data chunk "c", or data chunk "d") of data segment 116 may be stored 160 on each of mirrored targets 102, 104, 106, 108 (respectively), thus providing an increased level of performance. Specifically, when data segment 116 is subsequently read, each of mirrored targets 102, 104, 106, 108 may simultaneously provide their respective data chunk to storage initiator device 100, thus reducing the amount of time required to obtain data segment 116.

When storing 160 the unique data chunk (e.g., data chunk "a", data chunk "b", data chunk "c", or data chunk "d") of data segment 116 on each of mirrored targets 102, 104, 106, 108 (respectively), the unique data chunk may be stored in a manner that facilitates easy retrieval (i.e. during read requests) of data segment 116. For example, each data chunk may be stored at the same memory address on each of mirrored targets 102, 104, 106, 108. Specifically, when the four two-kilobyte data chunks (e.g., data chunk "a", data chunk "b", data chunk "c", and data chunk "d") of eight-kilobyte data segment 116 are stored on mirrored targets 102, 104, 106, 108, each two-kilobyte data chunk may be stored at the same memory address within each of mirrored targets 102, 104, 106, 108.

Upon receiving data segment 116 (and/or storing 160 the respective data chunk of data segment 116), the mirrored target receiving data segment 116 (and/or storing 160 the respective data chunk of data segment 116) may transmit a positive acknowledgment to multicast group 112 (i.e. a message that announces that the subject mirrored target did receive data segment 116 (and/or store 160 the respective data chunk of data segment 116).

Conversely, in the event that the mirrored target fails to receive data segment 116 (and/or store 160 the respective data chunk of data segment 116), the mirrored target in question may transmit a negative acknowledgment to multicast group 112 (i.e. a message that announces that the subject mirrored target did not receive data segment 116 (and/or store 160 the respective data chunk of data segment 116). In the event that a negative acknowledgment is transmit to multicast group 112, one or more of the mirrored targets that did indeed successfully receive data segment 116 may either multicast data segment 116 to multicast group 112 or may unicast data segment 116 to the specific mirrored target that transmitted the negative acknowledgment (i.e., the mirrored target that did not receive the multicast data segment).

As discussed above, each mirrored target (e.g. mirrored target 102, 104, 106, 108) may include a plurality of storage targets (e.g., storage targets 102A, 102B, 102C) that may be mirrored with respect to each other. Accordingly, upon receiving data segment 116 (which was multicast 158 by storage initiator device 100), data striping/mirroring process 10 may store 160 a unique data chunk of data segment 116 on each storage target included within the receiving mirrored target. For example, upon receiving data segment 116 on e.g., mirrored target 102, data striping/mirroring process 10 may store 160 an identical copy of data chunk "a" on each of storage targets 102A, 102B, 102C. Accordingly, in the event of a failure of up to two of storage targets 102A, 102B, 102C, data chunk "a" may be retrieved from the surviving storage target.

Figure 4:
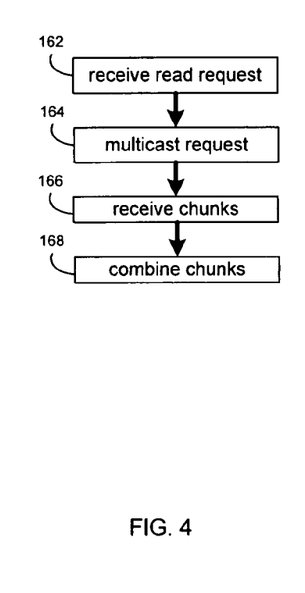
FIG. 4 is a flowchart of a data read process executed by the data striping/mirroring process of FIG. 1.

Referring also to FIG. 4, upon storage initiator device 100 receiving 162 a read request (e.g. read request 118) for reading a data segment (e.g. data segment 116) from multicast group 112, data striping/mirroring process 10 may multicast 164 read request 118 to the mirrored targets (e.g. mirrored targets 102, 104, 106, 108) included within multicast group 112.

Upon receiving read request 118, each of mirrored targets 102, 104, 106, 108 may retrieve the appropriate data chunk of data segment 116 for transmitting (either as a multicast or unicast) to storage initiator device 100. As discussed above, data striping/mirroring process 10 may store 160 a unique data chunk of the data segment 116 on each of the plurality of mirrored targets (e.g. mirrored targets 102, 104, 106, 108). For example, data striping/mirroring process 10: may store 160 data chunk "a" on mirrored target 102; may store 160 data chunk "b" on mirrored target 104; may store 160 data chunk "c" on mirrored target 106; and may store 160 data chunk "d" on mirrored target 108. Accordingly, upon receiving read request 118: mirrored target 102 may retrieve data chunk "a"; mirrored target 104 may retrieve data chunk "b"; mirrored target 106 may retrieve data chunk "c"; and mirrored target 108 may retrieve data chunk "d".

As discussed above, each mirrored target (e.g. mirrored target 102, 104, 106, 108) may include a plurality of storage targets (e.g., storage targets 102A, 102B, 102C) that may be mirrored with respect to each other. Accordingly, upon receiving read request 118, mirrored target 102 may retrieve data chunk "a" from any of storage targets 102A, 102B, 102C. Further, in the event of a failure of up to two of storage targets 102A, 102B, 102C, data chunk "a" may be retrieved from the surviving storage target.

As discussed above, when storing 160 the unique data chunk (e.g., data chunk "a", data chunk "b", data chunk "c", or data chunk "d") of data segment 116 on each of mirrored targets 102, 104, 106, 108 (respectively), the unique data chunk may be stored in a manner that facilitates easy retrieval (i.e. during read requests) of data segment 116. For example, each data chunk may be stored at the same memory address on each of mirrored targets 102, 104, 106, 108. Accordingly, when retrieving the four two-kilobyte data chunks (e.g., data chunk "a", data chunk "b", data chunk "c", and data chunk "d") of eight-kilobyte data segment 116 stored on mirrored targets 102, 104, 106, 108, a two-kilobyte read operation may be performed at the same memory address on each of mirrored targets 102, 104, 106, 108 to effectuate the retrieval of the four two-kilobyte data chunks (e.g., data chunk "a", data chunk "b", data chunk "c", and data chunk "d").

Upon retrieving the appropriate data chunks, mirrored targets 102, 104, 106, 108 may transmit (either as a multicast or unicast) data chunk "a", data chunk "b", data chunk "c", and data chunk "d" (respectively) to storage initiator device 100.

Upon receiving 166 the appropriate data chunks transmitted by e.g. mirrored targets 102, 104, 106, 108, data striping/mirroring process 10 may combine 168, on storage initiator device 100, the unique data chunk received from each of the plurality of mirrored targets to generate data segment 116. Specifically, data striping/mirroring process 10 may combine 168 data chunk "a", data chunk "b", data chunk "c", and data chunk "d" (respectively) on storage initiator device 100 to generate data segment 116. Once generated, data striping/mirroring process 10 may transmit data segment 116 to the client electronic device (e.g., personal computer 38, laptop computer 40, personal digital assistant 42, and notebook computer 44) that requested data segment 116.

A number of implementations have been described. Nevertheless, it will be understood that various modifications may be made. Accordingly, other implementations are within the scope of the following claims.

What is claimed is:

1. A multicast data striping/mirroring method comprising:
    defining a multicast group within a local area network, wherein the multicast group includes a storage initiator device and a plurality of mirrored targets, wherein each mirrored target includes a plurality of storage targets;
    receiving, on the storage initiator device, a write request for storing a data segment within the multicast group;
    multicasting the data segment to the plurality of mirrored targets included within the multicast group;
    storing a first unique data chunk of the data segment on a first mirrored target of the plurality of mirrored targets;
    storing a second unique data chunk of the data segment on a second mirrored target of the plurality of mirrored targets;
    transmitting a positive acknowledgement from the first and second mirrored targets to the multicast group if the first and second unique data chunks of the data segment are received;
    transmitting a negative acknowledgement from the first mirrored target of the plurality of mirrored targets to the multicast group if the first unique data chunk of the data segment is not received; and
    in response to a read request for the data segment, receiving the first and second unique data chunk from the first and second mirrored target, wherein each of the first mirrored target and the second mirrored target simultaneously transmit the first and second unique data chunk of the data segment to the storage initiator device;
    wherein the first unique data chunk and the second unique data chunk have the same memory address within each of the first mirrored target and the second mirrored target,
    wherein each mirrored target of the plurality of mirrored targets is configured to transmit different acknowledgments to the multicast group based upon, at least in part, whether data is received; and
        wherein when the negative acknowledgement is transmitted from the first mirrored target to the multicast group, one or more of the plurality of mirrored targets that successfully receives the first unique data chunk of the data segment unicasts the first unique data chunk to the first mirrored target.

2. The multicast data striping method of claim 1 wherein defining the multicast group includes at least one of:
    defining a group of IP addresses to be addressable as a whole by a single multicast IP address; and
    defining a group of MAC addresses to be addressable as a whole by a single multicast MAC address.

3. The multicast data striping method of claim 1 wherein at least one of the plurality of storage targets is chosen from the group consisting of: a hard drive; a RAID array of hard drives; a computer device including one or more hard drives; and a storage area network.

4. The multicast data striping method of claim 1, wherein storing the first unique data chunk of the data segment on the first mirrored target includes storing the first unique data chunk of the data segment on at least two of the plurality of storage targets included in the first mirrored target and storing the second unique data chunk of the data segment on the second mirrored target includes storing the second unique data chunk of the data segment on at least two of the plurality of storage targets included in the second mirrored target.

5. A computer program product residing on a non-transitory computer readable medium having a plurality of instructions stored thereon which, when executed by a processor, cause the processor to perform operations comprising:
    defining a multicast group within a local area network, wherein the multicast group includes a storage initiator device and a plurality of mirrored targets, wherein each mirrored target includes a plurality of storage targets;
    receiving, on the storage initiator device, a write request for storing a data segment within the multicast group;
    multicasting the data segment to the plurality of mirrored targets included within the multicast group;
    storing a first unique data chunk of the data segment on a first mirrored target of the plurality of mirrored targets;
    storing a second unique data chunk of the data segment on a second mirrored target of the plurality of mirrored targets;
    transmitting a positive acknowledgement from the first and second mirrored targets to the multicast group if the first and second unique data chunks of the data segment are received;
    transmitting a negative acknowledgement from the first mirrored target of the plurality of mirrored targets to the multicast group if the first unique data chunk of the data segment is not received; and
    in response to a read request for the data segment, receiving the first and second unique data chunk from the first and second mirrored target, wherein each of the first mirrored target and the second mirrored target simultaneously transmit the first and second unique data chunk of the data segment to the storage initiator device;
    wherein the first unique data chunk and the second unique data chunk have the same memory address within each of the first mirrored target and the second mirrored target;
    wherein each mirrored target of the plurality of mirrored targets is configured to transmit different acknowledgments to the multicast group based upon, at least in part, whether data is received; and
        wherein when the negative acknowledgement is transmitted from the first mirrored target to the multicast group, one or more of the plurality of mirrored targets that successfully receives the first unique data chunk of the data segment unicasts the first unique data chunk to the first mirrored target.

6. The computer program product of claim 5 wherein the instructions for defining the multicast group include instructions for at least one of:
defining a group of IP addresses to be addressable as a whole by a single multicast IP address; and
defining a group of MAC addresses to be addressable as a whole by a single multicast MAC address.

7. The computer program product of claim 5 wherein at least one of the plurality of storage targets is chosen from the group consisting of: a hard drive; a RAID array of hard drives; a computer device including one or more hard drives; and a storage area network.

8. The computer program product of claim 5, wherein storing the first unique data chunk of the data segment on the first mirrored target includes storing the first unique data chunk of the data segment on at least two of the plurality of storage targets included in the first mirrored target and storing the second unique data chunk of the data segment on the second mirrored target includes storing the second unique data chunk of the data segment on at least two of the plurality of storage targets included in the second mirrored target.

9. A multicast data striping/mirroring method comprising:
defining a multicast group within a local area network, wherein the multicast group includes a storage initiator device and a plurality of mirrored targets, wherein each mirrored target includes a plurality of storage targets;
in response to a write request, transmitting a positive acknowledgement from a first and a second mirrored target of the plurality of mirrored targets to the multicast group if a first and a second unique data chunk of a data segment is received on the first and second mirrored targets;
in response to the write request, transmitting a negative acknowledgement from the first mirrored target of the plurality of mirrored targets to the multicast group if the first unique data chunk of the data segment is not received;
receiving, on the storage initiator device, a read request for reading the data segment from the multicast group;
multicasting the read request to the plurality of mirrored targets included within the multicast group;
receiving, on the storage initiator device, the first unique data chunk of the data segment from the first mirrored target of the plurality of mirrored targets; and
receiving, on the storage initiator device, the second unique data chunk of the data segment from the second mirrored target of the plurality of mirrored targets;
wherein the first unique data chunk and the second unique data chunk have the same memory address within each of the first mirrored target and the second mirrored target;
wherein each of the first mirrored target and the second mirrored target simultaneously transmit the first and second unique data chunk of the data segment to the storage initiator device;
wherein each mirrored target of the plurality of mirrored targets is configured to transmit different acknowledgments to the multicast group based upon, at least in part, whether data is received; and
wherein when the negative acknowledgement is transmitted from the first mirrored target to the multicast group, one or more of the plurality of mirrored targets that successfully receives the first unique data chunk of the data segment unicasts the first unique data chunk to the first mirrored target.

10. The multicast data striping method of claim 9 wherein defining the multicast group includes at least one of:
defining a group of IP addresses to be addressable as a whole by a single multicast IP address; and
defining a group of MAC addresses to be addressable as a whole by a single multicast MAC address.

11. The multicast data striping method of claim 9 wherein at least one of the plurality of storage targets is chosen from the group consisting of: a hard drive; a RAID array of hard drives; a computer device including one or more hard drives; and a storage area network.

12. The multicast data striping method of claim 9 further comprising:
combining, on the storage initiator device, a unique data chunk received from each of the plurality of mirrored targets to generate the data segment.

13. The multicast data striping method of claim 9 wherein each unique data chunk of the data segment received on the storage initiator device is transmitted from one or more of the mirrored targets.

14. The multicast data striping method of claim 9, further comprising:
receiving the first unique data chunk of the data segment from at least one of the plurality of storage targets included in the first mirrored target; and
receiving the second unique data chunk of the data segment from at least one of the plurality of storage targets included in the second mirrored target.

15. A computer program product residing on a non-transitory computer readable medium having a plurality of instructions stored thereon which, when executed by a processor, cause the processor to perform operations comprising:
defining a multicast group within a local area network, wherein the multicast group includes a storage initiator device and a plurality of mirrored targets, wherein each mirrored target includes a plurality of storage targets;
in response to a write request, transmitting a positive acknowledgement from a first and a second mirrored target of the plurality of mirrored targets to the multicast group if a first and a second unique data chunk of a data segment is received on the first and second mirrored targets;
in response to the write request, transmitting a negative acknowledgement from the first mirrored target of the plurality of mirrored targets to the multicast group if the first unique data chunk of the data segment is not received;
receiving, on the storage initiator device, a read request for reading a data segment from the multicast group;
multicasting the read request to the plurality of mirrored targets included within the multicast group;
receiving, on the storage initiator device, a first unique data chunk of the data segment from a first mirrored target of the plurality of mirrored targets; and
receiving, on the storage initiator device, a second unique data chunk of the data segment from a second mirrored target of the plurality of mirrored targets;
wherein the first unique data chunk and the second unique data chunk have the same memory address within each of the first mirrored target and the second mirrored target;

wherein each of the first mirrored target and the second mirrored target simultaneously transmit the first and second unique data chunk of the data segment to the storage initiator device;

wherein each mirrored target of the plurality of mirrored targets is configured to transmit different acknowledgments to the multicast group based upon, at least in part, whether data is received; and wherein when the negative acknowledgement is transmitted from the first mirrored target to the multicast group, one or more of the plurality of mirrored targets that successfully receives the first unique data chunk of the data segment unicasts the first unique data chunk to the first mirrored target.

16. The computer program product of claim 15 wherein the instructions for defining the multicast group include instructions for at least one of:

defining a group of IP addresses to be addressable as a whole by a single multicast IP address; and defining a group of MAC addresses to be addressable as a whole by a single multicast MAC address.

17. The computer program product of claim 15 wherein at least one of the plurality of storage targets is chosen from the group consisting of: a hard drive; a RAID array of hard drives; a computer device including one or more hard drives; and a storage area network.

18. The computer program product of claim 15 further comprising instructions for:

combining, on the storage initiator device, a unique data chunk received from each of the plurality of mirrored targets to generate the data segment.

19. The computer program product of claim 15 wherein each unique data chunk of the data segment received on the storage initiator device is transmitted from one or more of the mirrored targets.

20. The computer program product of claim 15, further comprising instructions for:

receiving the first unique data chunk of the data segment from at least one of the plurality of storage targets included in the first mirrored target; and receiving the second unique data chunk of the data segment from at least one of the plurality of storage targets included in the second mirrored target.

\* \* \* \* \*